(No Model.)
F. E. DEGENHARDT.
TERMINAL OR DISTRIBUTING BOX.
No. 364,994. Patented June 14, 1887.
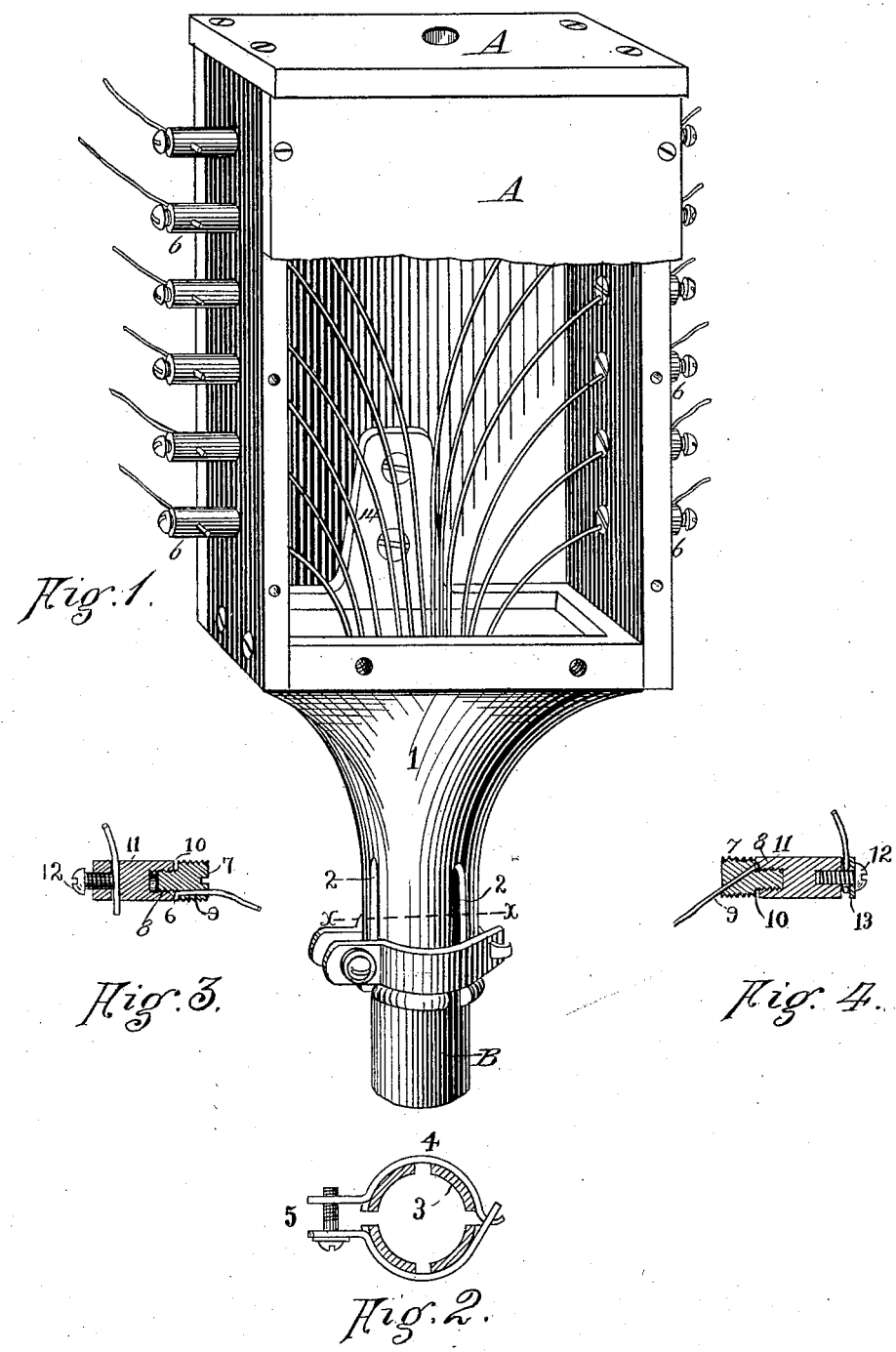
WITNESSES:
INVENTOR,
Frederick E. Degenhardt
Darwin S. Wolcott
Att'y.

UNITED STATES PATENT OFFICE.

FREDERICK E. DEGENHARDT, OF CHICAGO, ILLINOIS.

TERMINAL OR DISTRIBUTING BOX.

SPECIFICATION forming part of Letters Patent No. 364,994, dated June 14, 1887.

Application filed January 8, 1887. Serial No. 223,763. (No model.)

*To all whom it may concern:*

Be it known that I, FREDERICK E. DEGENHARDT, residing at Chicago, in the county of Cook and State of Illinois, a citizen of the United States, have invented or discovered certain new and useful Improvements in Terminal or Distributing Boxes, of which improvements the following is a specification.

In the accompanying drawings, which make part of this specification, Figure 1 is a view in perspective of my improved terminal or distributing box, a portion of one side of the box being broken away to show the relative arrangement of the wires of the cables. Fig. 2 is a transverse sectional view of the cable clip or holder, the section being taken on the line *x x* of Fig. 1. Fig. 3 is a sectional view, on an enlarged scale, of one of the binding-posts; and Fig. 4 is a view, similar to Fig. 3, of a modified form of the binding-post.

The invention herein relates to certain improvements in boxes used for distributing wires at the terminals or ends of the cable or cables, or at such points where branches or loops may be wished in the line of the cable, the object of the said invention being to provide means whereby the wires of the cable may be connected with a series of air-line wires, or with the wires leading to a switch-board, without necessitating the opening of the cable or the testing of each wire in order to ascertain the proper connection; and it is a further object of said invention to provide an easy means whereby the ends of a line of underground cable or cables may be connected with a series of air-line wires without exposing the cable or the wires thereof to atmospheric influences.

In the practice of my invention I provide a box, A, of suitable dimensions, which, in connecting underground cables with air-line wires, is secured in any suitable manner to a pole or other support for the air-line wires. This box A is provided at its lower end with a metallic socket or tube, 1, having a flaring upper end and fitting closely within the box, the lower end of said tube or socket having an internal diameter approximately equal to the external diameter of the cable B, with the wires of which connection is to be made. The wires of the cable, having been stripped, are inserted upwardly through the tube or socket 1 into the box, a portion of the cable proper fitting within this socket, as clearly shown in Fig. 1. In order to relieve the wires within the box of the weight of the cable, and to hold the same securely in place, the lower end of the socket is slitted, as at 2, thereby forming a clip or holder, consisting of a series of elastic fingers or prongs, 3, which are tightly clamped or closed against the cable by the clamp 4.

Although any suitable clamping device may be used for closing the fingers 3, I prefer to use the form shown, which consists of two semicircular portions or parts connected by a lug and slot on one side and a screw, 5, on the opposite side, this form of clamp being readily and easily applied to the socket.

After the wires have been inserted into the box, and the cable securely clamped by the fingers at the lower end of the socket, each of the wires is connected to one of the binding-posts 6, attached or screwed to the sides of the box. These binding-posts 6 consist of a plug, 7, exteriorly threaded for screwing into the box or frame, which is preferably made of hard rubber or vulcanized fiber and provided with a threaded stem, 8. This plug 7, extending entirely through the side of the box, is provided with a hole, 9, extending from the end of the plug to a shoulder, 10, formed at the junction of the body of the plug and stem 8. The wires within the box are passed through the holes 9 in the plugs, and are clamped or pressed against the shoulder 10 by caps 11, each provided with an interiorly-threaded socket screwing onto the threaded stem 8. Through the outer end of the cap 11 is formed a transverse passage, through which is passed the end of the wire to be connected with one of the wires of the cable, said wire being held within the transverse passage by a set-screw, 12, screwing into a threaded hole intersecting the transverse hole for the wire; or, in lieu of the manner of connecting the air-line wire to the binding-post above described, the transverse opening may be omitted and the wire wrapped around the screw 12 and clamped between the head of the cap 11 and a washer, 13, fitting on the screw, as clearly shown in Fig. 4.

The socket 1 is made with a rectangular upper end, in order to fit closely within the box, and thereby close the lower end of the same, and is held in place by screws passing through a lug, 14, formed on the socket and screwing into the back of the box, or the lug may be omitted and the socket held in place by screws passing through the sides of the box and screwing into the end of said socket, as shown; or, if desired, and preferably, both these forms of connection may be used.

After the wires within the box have been connected, as above described, with their respective binding-posts 6, the front of the box is screwed in place and asphaltum or other suitable insulating material is poured into the box through the upper end or a hole left in the top for the purpose, completely filling the same and insulating the wires therein from each other.

In using the above-described terminal or distributing box on poles or any other exposed position, it is preferable that box A should be inclosed within another water-tight box, in order to prevent, as far as possible, access of moisture or other injurious atmospheric influences to the distributing-box A. It is preferable that the back, front, and top of the box A should be made of wood, metal, or any other suitable inexpensive material; but the sides, through which electrical connection is made by the binding-posts with the two lines of wire, should be made of hard rubber, vulcanized fiber, or other good insulating material.

In case it is desired to use two or more small cables in lieu of one large one, the socket 1 may be formed with two or more of the clamping-tubes, as will be readily understood.

The binding-posts herein shown and described may be used for other purposes than that set forth, and hence I do not wish to limit myself to the use of said posts in connection with terminal or distributing boxes.

I claim herein as my invention—

The combination of a box or case, a socket or tube connected to one end of said box or case, said tube being provided with elastic fingers, a clamp for forcing said fingers inwardly, and binding-posts forming electrical connection through the walls of the box, substantially as set forth.

In testimony whereof I have hereunto set my hand.

FREDERICK E. DEGENHARDT.

Witnesses:
WM. A. GRAHAM,
H. J. SCHOENLAND.